July 12, 1966   O. MÜLLER   3,260,996
MATRIX SELECTION CIRCUIT
Filed Aug. 30, 1961   3 Sheets-Sheet 1

INVENTOR
Otto Müller

BY *George B Spencer*
ATTORNEY

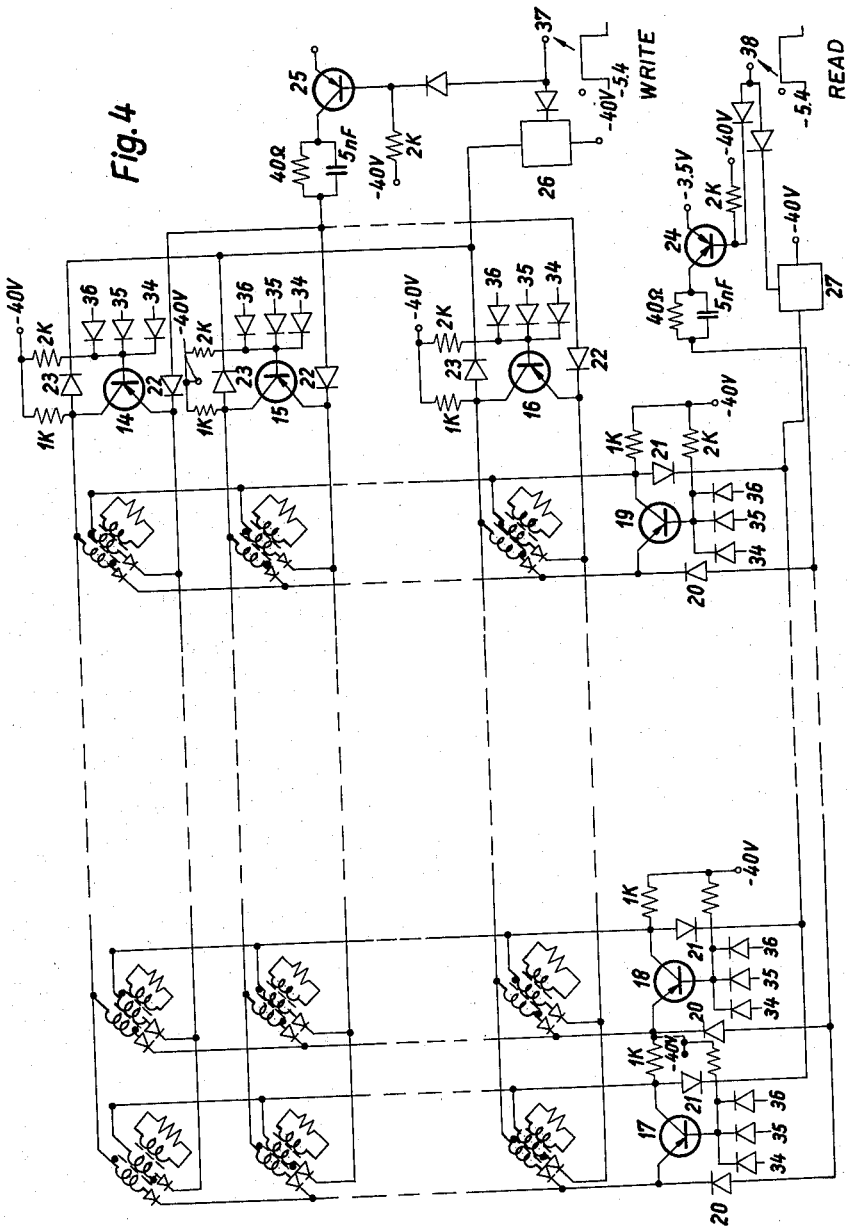

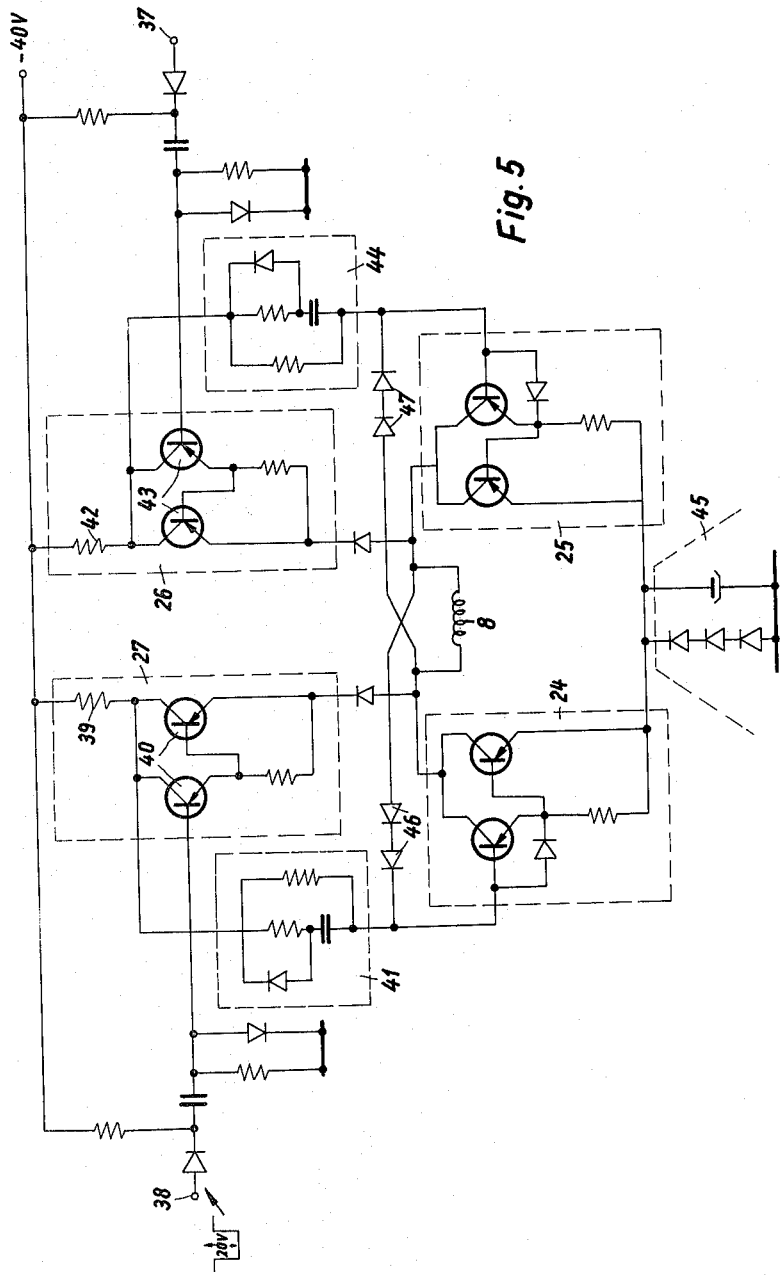

United States Patent Office 3,260,996
Patented July 12, 1966

3,260,996
MATRIX SELECTION CIRCUIT
Otto Müller, Sulzbach (Murr), Germany, assignor to Telefunken Patentverwertungs-G.m.b.H., Ulm (Danube), Germany
Filed Aug. 30, 1961, Ser. No. 134,899
Claims priority, application Germany, Sept. 3, 1960, T 18,955
11 Claims. (Cl. 340—166)

The present invention relates generally to a device for selecting certain load circuits from a great number of load circuits and for selectively exciting the load circuit with a positive or negative current. It is particularly concerned with the problem of locating a selection wire of a magnetic core storage unit in electronic computers.

According to the coincidence current principle, in order to excite an individual core of a core storage unit, one line wire and one column wire are each provided with one-half of the current which is necessary to reverse the magnetic polarity of the cores. Currents which differ in direction are required for the reading process and the writing process, respectively. The problem is to select a load circuit on the basis of a program address and to excite this load circuit with selectively positive or negative currents, because in the selection circuit a line wire or a column wire of the core storage unit represents a load circuit having a predominantly inductive impedance.

Various circuits, predominantly designed in matrix form, are known for selecting such load circuits. The load circuits are connected with the crossing point of the selection matrix either electro-conductively or galvanically via diodes, or via transformers having a linear or even a rectangular characteristic. (The term "diode" as used throughout the instant specification and claims is deemed to include any rectifier element.) A closed circuit is formed by a line wire, the selected load circuit, and a column wire via switches arranged at each line wire and column wire of the selection matrix. Diodes are connected in series with each load circuit for disconnecting the load circuits not selected. However, the presence of these diodes and the excitation by currents of different polarity requires that two different current paths must be provided, i.e., at least two wires per line in the line direction or two wires per column in the column direction. A disadvantageous effect is presented by the push-pull device which is necessary and which requires that even the non-selected second wire of the wire pair must have its potential changed so that therefore the voltage leap at the switch is about twice that of the useful voltage. These factors are of special importance in large matrices and in a control circuit formed with transistors.

To avoid these drawbacks, circuits have been designed and are known wherein each line and each column comprises one pair of wires so that each load circuit is connected via diodes with four wires. These selection matrices have a switch, e.g., a transistor, for each line wire and for each column wire, with two switches advantageously being combined so that a common address-controlled control pulse prepares both switches. Also, pulses are transmitted via one or two further imputs having multiple connections through all line switches and column switches, which pulses close one switch of the selected switch pair, thereby determining the polarity of the current in the load circuit. With this type of circuit control it follows that the currents in all line wires advantageously have the same sense of direction, and that the currents in all column wires also have the same sense of direction.

With these defects of the prior art in mind, it is a main object of the present invention to provide a control circuit of the type described wherein a substantially reduced number of switch transistors are used and the disadvantages obtained with other attempted solutions to the problem are obviated.

Another object of the invention is to provide a circuit of the type described which simplifies the address control by permitting direct connection of the address register via decoding diodes.

These objects and others ancillary thereto are accomplished according to preferred embodiments of the invention wherein the direction of the current in the first wires of all line wire pairs and column wire pairs is opposite to that in second wires. As a result only one single-pole switch controlled by the selection address need be provided between the two wires of each line wire pair and each column wire pair. The first wires of each line wire pair as well as the second wires of each column wire pair are connected after or behind the switches. In each case they are connected to each other through diodes, and are connected to a fixed potential via two interrupters. The second wires of each line wire pair as well as the first wires of each column wire pair are respectively connected to each other, via further diodes and each set is connected with one current impressing circuit.

Additional objects and advantages of the present invention will become apparent upon consideration of the following description when taken in conjunction with the accompanying drawings in which:

FIGURE 4 is a circuit diagram of a practical embodiment.

FIGURE 5 is a circuit diagram of a current impressing circuit and other features of the practical embodiment of FIGURE 4.

Figure 1:
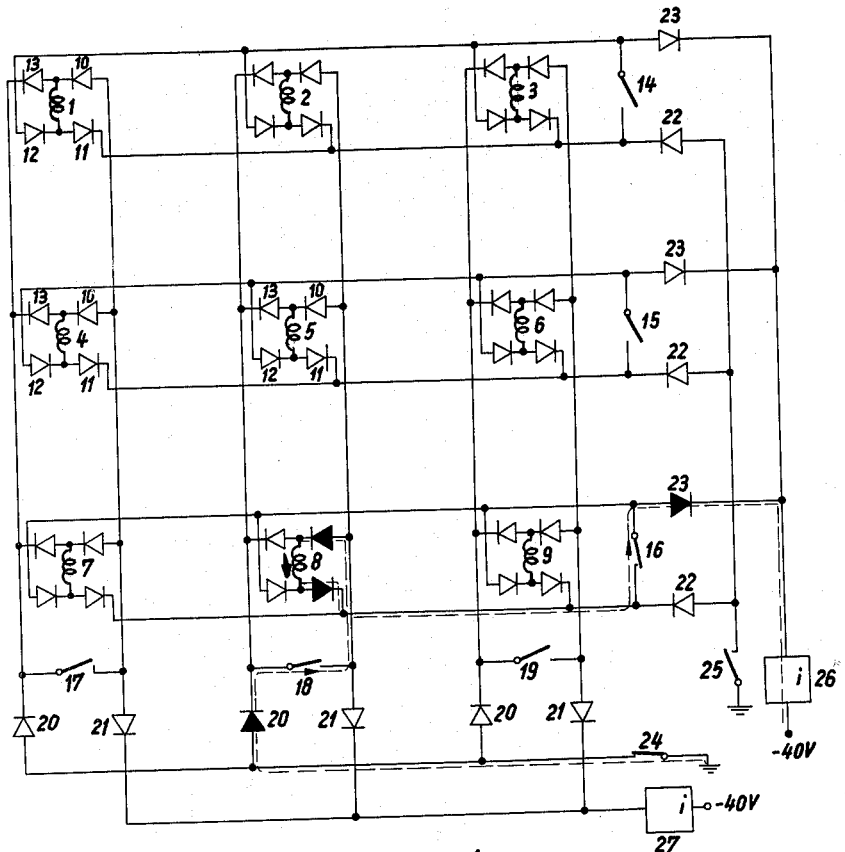
FIGURE 1 is a simplified circuit diagram of a fundamental embodiment of the invention.

With more particular reference to the drawings, the principle of the invention may be seen from FIGURE 1. A selection matrix is provided for selecting one out of nine load circuits 1 to 9. These load circuits are formed by the line wires or column wires of a magnet core matrix. Load circuits 1–9 are arranged in the crossing points of a matrix plane of three line wire pairs and three column wire pairs, with each load circuit connected with one line wire pair and one column wire pair via four diodes 10, 11, 12, 13. Switches 14, 15, and 16 are connected between the two wires of each line wire pair, and switches 17, 18, 19 are connected likewise in the columns. The left column wires of each pair are connected to each other via diodes 20 and are connected to the zero volt potential via an interrupter switch 24 which is closed in its rest position. Analogous thereto, the bottom wires of each line wire pair are connected to each other via diodes 22 and are grounded via an interrupter switch 25. The top wires of each line wire pair, just as the right column wires, are connected via diodes 23 and 21, respectively, to a current impressing circuit 26 and 27, respectivel, i.e., a source of constant current. The circuit potential of this current amounts to −40 v.

The selection of a load circuit is demonstrated in FIGURE 1 wherein the load circuit 8 is assumed to be selected. First the switches 18 and 16 are closed and simultaneously therewith the interrupter 25 is opened and the current impressing circuit 26 is connected. A constant current then flows from ground via the interrupter 24, a diode 20, the column switch 18, a diode 10, the load circuit 8, a diode 11, the line switch 16, a diode 23 and the current impressing circuit 26. To excite the load circuit 8 by currents which are opposite in direction, the switches 16 and 18 remain closed while the elements 24 and 27 are actuated instead of the elements 25 and 26.

It is to be noted that although the direction of current is reversed in the load circuit, and the current flows through the other wire of the selected line and column, the direction of current in the line switch 16 and in the column switch 18 remains the same. This makes possible the use of conventional transistors for the switches 14 to 19.

The advantage of the invention as compared to similar known devices resides especially in the simplicity of the control. In known matrices each line or column wire has a transistor switch, and the selection of an address, i.e., a pair of wires and of the current polarity in the load circuit, is not directly provided by using two corresponding switches as it is in the device according to the present invention. This is possible in the instant invention because a wire pair is selected by only one single-pole switch, while the direction of current in the load circuit is determined by the interrupters 24 and 25, respectively.

Figures 2, 3:
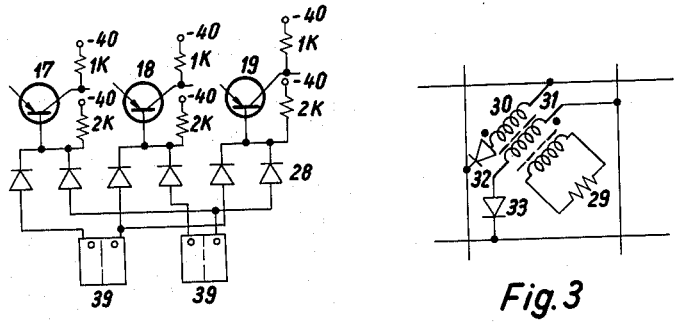
FIGURE 2 is a partial circuit diagram of a control circuit for the line switches or column switches.
FIGURE 3 is a fragmentary circuit diagram of another embodiment of a connection of a load circuit at a crossing point of a matrix.

Due to this simple control, the switches can be controlled directly by an address register in contrast to known selection matrices. In the present example the address register comprises two bistable elements 39 for the lines, and similar elements for the columns, as shown in FIGURE 2. The outputs of these bistable elements are linked via AND-diodes 28, and the result of the linkage is fed directly to the base of the switch transistors 14 to 16 or 17 to 19, respectively.

The interrupters 24 and 25 are both closed in the rest or normal position. When a load circuit is selected, first the proper line switch and the proper column switch are each closed, and then one of the interrupters is opened. If transistors are used for the switches 14 to 19 (FIGURE 2), a current flows before the interrupter is opened. The electrons flow through the selected switch transistor from the source of the transistor operating voltage, via a collector resistance, the collector emitter section of the switch transistor, a diode 20 or 22, respectively, or the interrupter 24 or 25, respectively, to ground. Thus, this flow is not through one of the load circuits. When the interrupter is opened, the same current flows through the load circuit (principle of power circuits or presetting).

It is also advantageous to switch in the current impressing circuit 26 or 27 only if the corresponding interrupter is opened so that no unnecessary current flows through a closed circuit including a switch and the closed interrupter. A single interrupter shaft or actuating element can open the interrupter and connect the current source to the circuit as shown in the practical embodiment of FIGURE 4. The load circuits are shown as connected with the two wire paths crossing one another via transformers. FIGURE 3 shows a section of the matrix with a crossing point and a load circuit 29. The transformer has two primary windings 30, 31 which are in series with a diode 32 or 33, respectively (for disconnecting the crossing points) between the four wires. The fundamental current path is the same as that of FIGURE 1. The two further diodes used in the circuit of FIGURE 1 are unnecessary here because of the electro-conductively separated transformer windings. The two primary windings 30, 31 of the transformer are wound in opposite directions.

The selection matrix of FIGURE 4 comprises eight line wire pairs and eight column wire pairs. Thus, the matrix serves for selecting one out of 64 load circuits. Sixty-four is frequently the number of the lines or of the columns of a magnetic core storage unit so that two such selection matrices may be provided for a storage matrix of 4096 binary units or bits.

To control the eight line switches, as well as the eight column switches, one tripartite address register (not shown) is necessary for each. Three diodes 34, 35, 36 lead from this register to each switch. The function of these diodes was described with reference to FIGURE 2. In general, the practical embodiment (FIGURE 4) corresponds, in principle, to FIGURE 1, so that identical parts carry the same reference numerals. There is a slight deviation since the interrupters 24 and 25 are not connected to zero volts or ground, but to −3.5 volts, so that the switch transistors 14 to 19 are more definitely blocked when their base electrodes are maintained at about zero volts by the address register via the diodes 34 to 36.

The two sources of constant current 26 and 27 may be provided in various ways. In the simplest case, they comprise a high-resistive series impedance. The control inputs of the interrupter 25 and of the source 26 which may be switched in and switched out, may therefore be combined via disconnecting diodes and controlled via a common input 37. If the input 38 is controlled instead of the input 37, then the interrupter 24 is open and the source 27 is connected, so that the current direction through the load circuit is reversed. Thus, for example, in the practical embodiment of the ferrite storage selection of FIGURE 4, a pulse at the input 37 may generate a writing pulse, while a pulse at the input 38 generates a reading pulse in a selected load circuit.

Due to this functional coupling of a current impressing circuit with an associated selected switch, the outputs of the current impressing circuits 26 or 27, respectively, may in each case be connected with the interrupters or switches 25 or 24, respectively. This is possible because each current pulse finds the corresponding switch open at the output of the source, and other current paths are prevented by the disconnecting diodes 20, 21, 22, 23 as well as 10, 11, 12, 13 or 32 and 33.

FIGURE 5 illustrates a preferred embodiment of the current impressing circuits and of the interrupters. A high-resistive impedance 39 is connected at one end with the negative operating voltage and a constant current flows through this resistance when a two stage transistor switch 40, in series with the resistance, presents a low resistance. The series connection of the switch 40 and the resistance 39 corresponds to the current impressing circuit 27 in FIGURE 4 or FIGURE 1, while an identical combination of a resistance 42 and a switch 43 forms the current impressing circuit 26. Each output of this latter circuit is connected with a further two stage transistor switch, which corresponds to the interrupters 24 and 25. The control inputs thereof are influenced by the current impressing circuits, each via a passive network 41 or 44, respectively, and preferably having a time-lag and nonlinear characteristic. If, for example, a reading pulse appears at the input 38, then the switch 40, which is blocked or non-conducting in its normal or rest position, momentarily conducts, and electrons flow through the resistance 39, the switch 40, through the load circuit 8 selected out of the matrix, and finally through the interrupter 25, which is closed in its rest position, and is connected to a slightly negative voltage formed by a diode chain 45. On the other hand, a current flows through the interrupter 24 only at the moment of switching, since then the positive voltage leap at the resistance 39 becomes effective, via the RC network 41, at the base of the first transistor of the interrupter 24, and blocks the current through this interrupter. The sequence of the connections has the advantage that the current pulse in the load circuit is initiated by opening the interrupter and not by closing a switch. When the pulse at the input 38 fades, the switch 40 again blocks and the negative voltage leap at the resistance 39 is transferred, via the network 41, to the interrupter 24. This time it occurs without any substantial delay since the time determining resistance of the network is bridged by a diode now biased in forward direction.

The circuit is completely symmetrical with respect to current direction in the load circuit so that an explanation of the writing control is unnecessary. Additional rectifier elements 46, 47 are provided, each disposed between the control input of the interrupters and the output of the opposite current impressing circuit. These diodes accept transient currents caused by the predominantly inductive load of the load circuit and occurring after switching off the driving pulse. The positive overshoot which appears after a negative drive pulse is conducted by the diodes so that side of the circuit which was not subjected to control, thus becoming harmless in this manner.

The invention is not limited to the device described but may also be carried out with n-p-n transistors, other voltage relationships, or even with electronic tube switches.

It will be understood that the above description of the present invention is susceptible to various modifications, changes, and adaptations, and the same are intended to be comprehended within the meaning and range of equivalents of the appended claims.

What is claimed is::

1. A selection circuit for selecting a load circuit from a large number of load circuits and especially selecting wires of a magnetic core storage device and for controlling the load circuit by means of current pulses of selective polarity using a matrix with each load circuit connected to a respective intersection thereof, said selection circuit comprising, in combination: a plurality of pairs of column wires, with each crossing of a respective one of said pairs of column wires by a respective one of said pairs of line wires defining one of the matrix intersections; a plurality of selector switches each of which is connected to the wires of a respective one of said pairs of wires; selector switches connected between the wires of each pair for short circuiting the wire pairs; current impressing means connected to all of the first wires of the line wire pairs and to all of the second wires of the column wire pairs; a first interrupter switch connected with the other wires of said line wire pairs and to fixed potential means; a second interrupter switch connected with the other wires of said column wire pairs and to fixed potential means; diode means connected in each of said wires between said selector switches and that one of said fixed potential means and current impressing means to which each said wire is connected, with those ones of said diodes which are connected to said current impressing means being conductive in a first direction and those ones of said diodes which are connected to said fixed potential means being conductive in the opposite direction for providing a polarity in that load circuit selected by closing one line selector switch and one column selector switch; and unidirectional conducting means connected at each of said intersections of a column wire pair and a line wire pair for connecting a respective one of such load circuits to said column wire pairs and to said line wire pairs, the connections being such that a current flows in one direction in the selected load circuit when the column interrupter switch is closed and current is impressed on the line wires and in the other direction in the load circuit when the line interrupter switch is closed and current is impressed on the column wires.

2. A circuit as defined in claim 1 wherein said unidirectional conducting means comprises two series circuit means at each of said intersections each series circuit including two diodes conductive in the same direction for connecting each load circuit to a respective intersection of said pairs of line and column wires.

3. A selection circuit as defined in claim 1, wherein said unidirectional conducting means comprises two diodes for connection to each terminal of its associated load circuit, the two diodes of one terminal being conductive in a first direction and being connected with the wires of a line wire pair and the two diodes of the other terminal being conductive in the opposite direction and being connected with the wires of a column wire pair.

4. A selection circuit as defined in claim 1, wherein each load circuit comprises the load proper and wherein said unidirectional conducting means comprises: a transformer having two primary windings; a first diode connected in series with one of said primary windings between the first line wire and the first column wire in the intersection of a line wire pair and a column wire pair; and a second diode connected in series with the other said primary winding between the second line wire and the second column wire of the same pair.

5. A selection circuit as defined in claim 2, wherein each of said selector switches comprises a transistor to whose base electrode the outputs of an address register are connectable via AND-diodes for causing only one of said selector switches associated with said line wire pairs and one of said selector switches associated with said column wire pairs to be closed at any given time.

6. A selection circuit as defined in claim 5, wherein said current impressing means are constituted by a first current impressing device connected to all of the first wires of said line wire pairs and a second current impressing device connected to all of the second wires of said column wire pairs, said selection circuit further comprising control means connected to said interrupter switches and said current impressing devices for turning on one of said current impressing devices and opening one of said interrupter switches.

7. A selection circuit as defined in claim 6, wherein one switch of a line and one switch of a column are closed before one of the two interrupter switches is opened.

8. A selection circuit as defined in claim 6, wherein each of said current impressing devices includes a resistance having one end connected to a source of operating voltage, and a two-stage transistor switch to which the other end of said resistance is connected, and wherein each of said interrupter switches is constituted by a transistor switch having a control input, said selection circuit further comprising two passive time-delay circuits each having an input connected to the common junction of said resistance and said transistor switch of a respective one of said current impressing devices and an output connected to said control input of a respective one of said interrupter switches.

9. A selection circuit as defined in claim 8, wherein said respective one of said current impressing devices and said respective one of said interrupter switches are both connected to wires of the same one of said pluralities of pairs of wires.

10. A selection circuit forming a control matrix for a storage device, comprising, in combination: a plurality of pairs of column wires: a plurality of pairs of line wires crossing said column wire pairs, with each crossing of a respective one of said pairs of column wires by a respective one of said pairs of line wires defining one of the intersections of the matrix; a current impressing source connected to all of the first wires of the line wire pairs and to all of the second wires of the column wire pairs; a first switch connected to all of the second wires of the line wire pairs and to a source of fixed potential; a second switch connected to all of the first wires of the column wire pairs and to a source of fixed potential; further switches connected between the wires of each pair at a point between the current source and the crossing of the wires; a set of first diodes connected to said first column wires respectively and disposed between said respective further switches and said second switch and conductive in a direction away from said second switch; a set of second diodes connected to said second column wires, respectively, and disposed between said respective further switches and said current source and conductive theretoward; a set of third diodes connected in said first line wires, respectively, and disposed between said respective further switches and said current source and conductive theretoward; a set of fourth diodes connected to said second line wires, respectively, and disposed between said respective further switches and said first switch and conductive away from said first switch; unidirectional conducting means at each of said intersections of a column wire pair and a line wire pair; and load circuit means connected to said unidirectional conducting means at each of said intersections, the connections being such that current flows in one direction in one of said load circuit means when said first switch is closed and current is impressed on the column wires and in the other direction in said one of said load circuit means when said second switch is closed and current is impressed on the line wires.

11. A circuit as defined in claim 10 wherein said unidirectional conducting means at each of said intersections includes a fifth diode connected to said first column wire and biased toward the diode connected thereto, a sixth diode connected to said second column wire and biased away from the diode connected thereto, a tapping point connecting said fifth and sixth diodes, a seventh diode connected to said first line wire and biased away from the diode connected thereto, an eighth diode connected to said second line wire and biased toward the diode connected thereto, a tapping point connecting said seventh and eighth diodes, and a load connected between said tapping points.

References Cited by the Examiner
UNITED STATES PATENTS

| | | | |
|---|---|---|---|
| 3,008,128 | 11/1961 | Powell | 340—166 |
| 3,014,202 | 12/1961 | Hanewinkel | 340—166 |
| 3,032,749 | 5/1962 | Newhouse | 340—166 |

NEIL C. READ, *Primary Examiner.*

L. HOFFMAN, H. PITTS, *Assistant Examiners.*